US010079638B2

United States Patent
Johansson et al.

(10) Patent No.: US 10,079,638 B2
(45) Date of Patent: Sep. 18, 2018

(54) METHOD AND OPTICAL NETWORK FOR FRONT HAUL PROTECTION

(71) Applicant: TRANSMODE SYSTEMS AB, Stockholm (SE)

(72) Inventors: Bengt Johansson, Hägersten (SE); Magnus Svevar, Järfälla (SE); Ola Wikström, Stockholm (SE); Mats Plantare, Stockholm (SE); Jan Skagerlund, Hägersten (SE)

(73) Assignee: TRANSMODE SYSTEMS AB, Stockholm (SE)

( * ) Notice: Subject to any disclaimer, the term of this patent is extended or adjusted under 35 U.S.C. 154(b) by 0 days.

(21) Appl. No.: 15/686,460

(22) Filed: Aug. 25, 2017

(65) Prior Publication Data

US 2017/0353237 A1    Dec. 7, 2017

Related U.S. Application Data

(63) Continuation of application No. PCT/SE2016/050149, filed on Feb. 26, 2016.
(Continued)

(51) Int. Cl.
*H04B 10/25*     (2013.01)
*H04B 10/032*    (2013.01)
*H04B 10/275*    (2013.01)
*H04B 10/2575*   (2013.01)
*H04J 14/02*     (2006.01)
*H04J 14/08*     (2006.01)
(Continued)

(52) U.S. Cl.
CPC ....... *H04B 10/032* (2013.01); *H04B 10/0795* (2013.01); *H04B 10/2575* (2013.01);
(Continued)

(58) Field of Classification Search
CPC .............. H04J 14/0283; H04J 14/0227; H04J 14/0212; H04J 14/0204; H04J 14/0246;
(Continued)

(56) References Cited

U.S. PATENT DOCUMENTS

2006/0083512 A1    4/2006    Wake
2009/0190466 A1*   7/2009    Girardi ............... H04L 41/0681
                                                           370/216
(Continued)

FOREIGN PATENT DOCUMENTS

EP    1553791 A1    7/2005
EP    2560302 A1    2/2013
(Continued)

OTHER PUBLICATIONS

Common Pubi ic Radio Interface (CPRI); Interface Specification 1-43 V6. 1, CPRI Specifi cation V6.1, Jul. 1, 2014, Ericsson AB, Huawei Technologies Co. Ltd , NEC Corporation, Alcatel Lucent, and Nokia Networks.

*Primary Examiner* — Don N Vo
(74) *Attorney, Agent, or Firm* — Gabriela B. Tomescu, Esq.; Bergenstråhle & Partners AB (57) ABSTRACT

An optical system is provided comprising a first node and a channel drop add device. The first node is configured to transmit data onto an optical fiber in a first line direction. The channel drop add device (501) is adapted to receive and add channels onto the optical fiber thereby transmitting the data into the first and a second line direction. The network further comprises a second node configured to form a transmitter/receiver function. The second node is configured to receive data on said optical fiber from said first and second line directions. Further, the second node is adapted to synchronize received data from said first and second line directions by delaying the data signals seeing the shortest delay, by a delay device.

20 Claims, 8 Drawing Sheets

Related U.S. Application Data (60) Provisional application No. 62/121,649, filed on Feb. 27, 2015, provisional application No. 62/121,633, filed on Feb. 27, 2015.

(51) Int. Cl.
*H04B 10/079* (2013.01)
*H04L 7/00* (2006.01)

(52) U.S. Cl.
CPC ........ *H04B 10/275* (2013.01); *H04J 14/0201* (2013.01); *H04J 14/08* (2013.01); *H04L 7/0075* (2013.01)

(58) Field of Classification Search
CPC .... H04J 14/0297; H04J 14/02; H04J 14/0205; H04J 14/0295; H04J 14/021; H04J 14/0291; H04J 14/0201; H04Q 11/0005; H04Q 2011/0016

USPC ............................................................ 398/7
See application file for complete search history.

(56) References Cited

U.S. PATENT DOCUMENTS

| 2016/0056886 A1* | 2/2016 | Kitamura ........... H04Q 11/0062 398/5 |
| 2016/0308640 A1* | 10/2016 | Wellbrock .......... H04J 14/0212 |
| 2016/0373841 A1* | 12/2016 | Sato .................... H04J 14/0212 |

FOREIGN PATENT DOCUMENTS

| WO | 2014187482 A1 | 11/2014 |
| WO | 2015/003746 A1 | 1/2015 |
| WO | 2015003746 A1 | 1/2015 |

\* cited by examiner

METHOD AND OPTICAL NETWORK FOR FRONT HAUL PROTECTION

This application is the continuation of International Application No. PCT/SE2016/050149, filed 26 Feb. 2016, which claims the benefit of U.S. Provisional Patent Application No. 62/121,649 and U.S. Provisional Patent Application No. 62/121,633, both filed on filed 27 Feb. 2015, the entire contents of which are hereby incorporated by reference.

TECHNICAL FIELD

The present invention relates to an optical network and devices and methods related thereto.

BACKGROUND

In radio access networks (RAN), traffic can be conveyed using the Common Public Radio Interface (CPRI) format, from e.g., a Base band unit (BBU) (containing a Radio Equipment Control (REC)) to a remote radio head (RRH) where the Radio Equipment (RE) is located.

When the Radio Equipment Control and the Radio Equipment are located at a distance from each other, CPRI supports that data on layer 1 (physical layer) can be transmitted from the REC to the RE using an optical interface. In other words, an electrical signal can be modulated onto an optical channel and transmitted as an optical signal over the optical interface, e.g. fiber, to the receiving side where it is demodulated into an electrical signal again, which is conveyable to a client interface. When the RE is located remote from the REC, the REC and the RE can be interconnected via an optical transmission line.

There is a constant desire to improve the performance and robustness in networks. This is also the case for radio access networks.

SUMMARY

It is an object of the present invention to provide an improved network.

This object and/or others is obtained by the method, devices and system as set out in the appended claims. Systems and methods are provided for enabling protection of, for example, the CPRI channels without interfering with the CPRI protocol itself. Hence, data transmission on a channel can be protected from interruption.

In accordance with one embodiment an optical network comprising a first node and a channel drop add device is provided. The first node is adapted to form a first transmitter/receiver function and configured to transmit data onto an optical fiber in a first line direction. The first node can comprise a transmitter adapted to perform the transmission of data onto an optical fiber in the first line direction. The transmitter/receiver can for example be a muxponder or a transponder. The channel drop add device is adapted to receive and add channels into a first and second line direction. The network further comprises a second node configured to form a transmitter/receiver function. The second node being configured to receive traffic from said first and second line directions. The second node can comprise a receiver adapted to receive data from said first and second line directions. The transmitter/receiver can for example be a muxponder or a transponder. The second node is adapted to convey data to a client interface for the data received for either said first or second line direction. The client interface can be the interface between the Radio Equipment (RE) and the Radio Equipment Control (REC). The second node is configurable to transmit data into the first and second directions using two line interfaces. The second node is configured to convey client data into one direction, the active line direction, selected from said first and second directions and the second node is configured to not convey client data into the other line direction, standby line direction, selected from said first and second directions.

In accordance with some embodiments the second node can be adapted to synchronize received data from said first and second line directions by delaying the data signals seeing the shortest delay by a delay device.

In accordance with some embodiments the second node is adapted to delay both data signals from the first and second line directions by an additional delay.

In accordance with some embodiments the data from the chosen active line is conveyed to the client interface, and the data from the client interface aimed for the shortest path, through the first or second line as stated above, is delayed with the first delay. The data from the client interface aimed for the longest path, through the first or second line as stated above, is only delayed with a second, shorter, delay.

In accordance with some embodiments the first node is detached from the channel drop add device. In some embodiments the first node and the channel drop and add device are co-located or integrated.

In accordance with some embodiments the second node is configured to comprise a WDM (wavelength division multiplex) filter for the first and second line side.

In accordance with some embodiments the channel drop add device is configured to only drop and add a parts of the used channels.

In accordance with some embodiments multiple channel drop add devices are configured in a ring configuration.

In accordance with some embodiments the system is adapted to perform transmission bidirectionally with upstream and downstream traffic in a single fiber. The channels can be closely separated. For example the channels can be separated at 50 GHz, 100 GHz, or 200 GHz.

In accordance with one embodiment the transmission is conducted in a dual fiber configuration with upstream and downstream traffic in separate fibers. The upstream and downstream channels can have the same wavelength In accordance with some embodiments a CPRI channel is carried in the first and second line direction.

In accordance with some embodiments several CPRI channels are multiplexed into one channel in the first and second line direction.

The system can also be used for a client format other than CPRI having delay and delay variations.

In accordance with some embodiments several formats having delay and delay variations are multiplexed into one channel.

In accordance with some embodiments the first node comprises a line and client interface.

The invention also extends to methods and devices used for implementing the above system and for transmitting data in the system.

Using the systems, methods and devices as set out herein it is possible to provide a protected optical transmission path from a baseband unit located at a distance from the radio equipment that is able to switch from an active transmission path to a protecting stand-by transmission path at a very short time.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors and associated memory) programmed to perform the methods described herein, as well as computer-readable media encoding instructions to perform the methods described herein.

The following description illustrates embodiments of the invention by way of example and not necessarily by way of limitation. Elements from different embodiments can be combined or substituted. Wherever possible, the same reference numbers will be used throughout the drawings to refer to the same or like parts.

Figure 1:
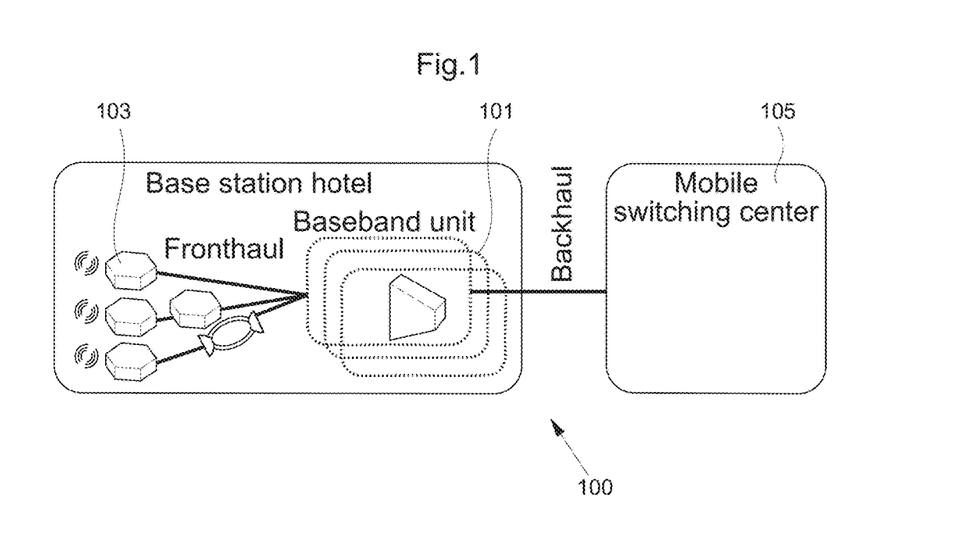
FIG. 1 shows the principal layout of a modern radio access network (RAN) network.

FIG. 1 shows the principal layout of a modern radio access network (RAN) network 100. Traffic in RAN is conveyed in the Common Public Radio Interface (CPRI) format from e.g. a Base band unit (BBU) 101 (containing a Radio Equipment Control (REC)) to a Remote radio head (RRH) with Radio Equipment (RE) 103. The Base Band Unit is in turn connected backwards in the Network via a network interface to e.g. a Mobile Switching Center (MSC). Depending on the RAN type the Base Band Unit can be connected to e.g. a Base Station Controller (BSC), a Radio Network Controller (RNC) or a similar higher level control node.

CPRI Channel Protection

Figure 2:
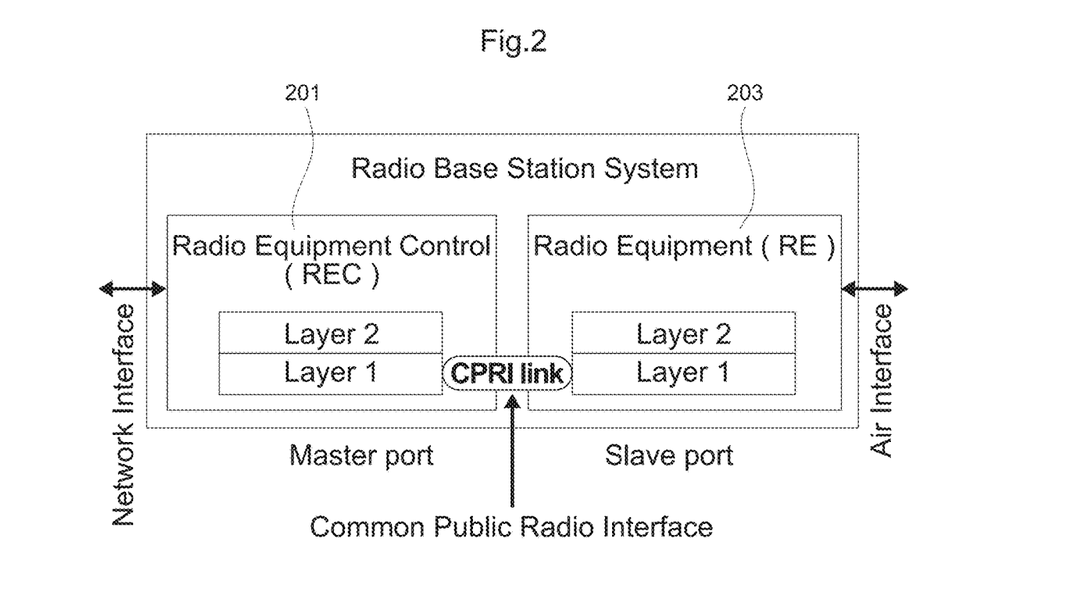
FIG. 2 shows a CPRI interface embodiments of the present invention.

FIG. 2 shows a CPRI interface. The goal is to convey CPRI traffic from the REC 201 to the RE 203 without affecting performance, i.e. to transparently transfer one or several CPRI channels from the REC 201 to one or several remote RE nodes 203. Several CPRI channels may be multiplexed into one proprietary channel.

In earlier traditional networks the Base band unit (BBU) was located just below the antennas—Remote radio heads (RRH). Nowadays modern networks can have detached the BBUs to be sitting at a Base band station Hotel (BSH) that contains several BBUs. The distances between the BSH where the REC is located and the RRH where the RE is located can be up to ~15-25 km or even more.

The BBU contains a Radio equipment controller (REC) that manages the link. The protocol between the BBU and the RRH is in some embodiments CPRI. See CPRI Specification 6.1. In accordance with other embodiments other formats can be used. For example OBSAI (Open Base Station Architecture Initiative) format can be used in some embodiments.

As has been realized by the inventors it would be advantageous if data from the REC to the RE could be transmitted in a protected manner so that it is ascertained or at least more likely that all data transmitted between the REC and the RE will arrive with acceptable time delay so that there will be no (or at least less) interruption in the data traffic between the REC and the RE is the currently active path is disconnected for some reason. This can be achieved by providing a network connecting BBUs in the Base band hotel (BBH) to one or several CPRI drop node(s)—here also called DU node. The DU node drops, in a protected way, the CPRI channels and then convey the CPRI channels to the RRH.

The DU node is likely to be sitting at a location close to the RRH, e.g. on a roof, and be transferring CPRI channels to the RRH. However, it can be hard and costly to protect the CPRI channels going up the last meters to the roof, which is why these meters may be left unprotected in some embodiments.

In accordance with one embodiment the protected network is built by a system where upstream data is transmitted from a node, e.g. the DU node described above or an add/drop node as described below, in two separate optical transmission paths to a node where the base band unit is located and downstream data is transmitted along one of the two separate optical transmission paths. Upstream is a direction from an RRH towards a BBU, whereas downstream is a direction from a BBU towards an RRH. The REC needs to know and compensate for the latency in a signal between the BBU and the RRH. This can be performed by a synchronization process between REC in the BBU node and RRH. The synchronization process can be based on round trip measurement where a symmetrical delay for down and uplinks transmission time is required to achieve a good accuracy. (See CPRI Specification 6.1 Delay calibration) An asymmetrical delay between these will decrease the accuracy to a point where it is unable to be used by the CPRI protocol.

The maximum distance between BSH (& REC, BBU) and RRH can be in the order of 15 km or more. Longer distances can be envisaged and the size of a FIFO buffer (or similar delay devices) used to compensate for different transmission lengths can be dimensioned accordingly. The transmission time can typically be about 75 µs over an optical transmission line. The refractive index in an optical fiber differs up to 0.5% for different fiber types. However, in all normal cases the same fiber type is used for upstream and downstream traffic. Nevertheless, the refractive index can differ even for the same fiber type in a two-fiber solution. A 0.1% difference is quite likely to happen in real networks. This difference would give 75 ns difference between up and down link assuming a two fiber solution. This would alone lead to 37.5 ns error in the delay calculation. In addition, a two fiber solution might have different fiber lengths, especially in passing fiber distribution panels or WDM filters.

The needed delay difference accuracy is (see CPRI Specification 6.1) about 8 ns which corresponds to less than 2 m fiber. Altogether, to guarantee a good accuracy the up and down CPRI links are advantageously transmitted in the same medium, i.e. a bidirectional scheme in a single fiber is preferred.

Optical ring topology is supported in the CPRI specification. However this is done using traditional Time Division Multiplex (TDM) rings.

Ring protection supporting several wavelengths is desired feature for these RAN networks. This may be done having two separate CPRI links over a WDM network where the CPRI links are routed in two different paths. However this requires dual CPRI interfaces both at the BBH node and at the RRH and larger internal switching.

Furthermore, the REC would need to establish and control two CPRI links for each channel. As earlier has been explained the RRH is sitting at the antenna and the DU at the roof. A scheme having dual CPRI links from RRH to RRH would require more equipment at the antenna. This should preferably be avoided.

As set out above this can be done using a bidirectional scheme having single CPRI interface both at the BBU as well at the RRH. However, switching from a working optical transmission path to a protecting optical transmission path, the CPRI channel has to reestablish the link. A new synchronization with respect to frequency and absolute frame timing accuracy may take up to 10 seconds (see CPRI Specification 3.9.1) plus the time for auto-negotiation of features.

To enable switching from an active to a stand-by path, the switching can be performed over to an already active protection path. However, this is not supported by the current CPRI standard specification 6.1 from 2014.

In accordance with one embodiment a ring network containing many CPRI channels aimed for different DUs can be configured to not be connected directly to each DU since a DU is typically sitting at the roof. Thus, a ring configuration with a connection via a DU node would not only increase the transmission link but also increase the risk of a fiber break. In accordance with one embodiment a channel drop/add node (CDAM), detached from DU node, can then be used. The channel drop/add nodes can then be located close to the DU node, but at a location separated from the DU node to reduce the risk of fiber brake. For example the DU node can be located at a roof whereas the drop/add node can be located at ground level below the roof.

Another desired feature is to have per channel protection (in contrast to link protection). This increase the reliability as well as the flexibility. Moreover, it enables a ring network where the CDAM only drops a band of the channels and another (or several) CDAM drops another band. In case of a fiber break between two CDAMs the traffic still can be carrying traffic.

A network configuration as set out above will accomplish the requirement of having symmetrical delay for uplink and down link. Protection is accomplished without the REC and RRH having to renegotiate the CPRI channel. Protection with WDM transmission will be achieved well within 50 ms protection time. Channel protection will enable higher reliability and more flexibility. The network configuration will be cost effective, using the same transceiver at DUs both for active and protection path.

The network configuration provides a protected link carrying CPRI channels in a cost effective way. Latency compensation is done combined with a protection scheme where protection is done dual ended even though the protection only is actively done at one side.

Figure 3:
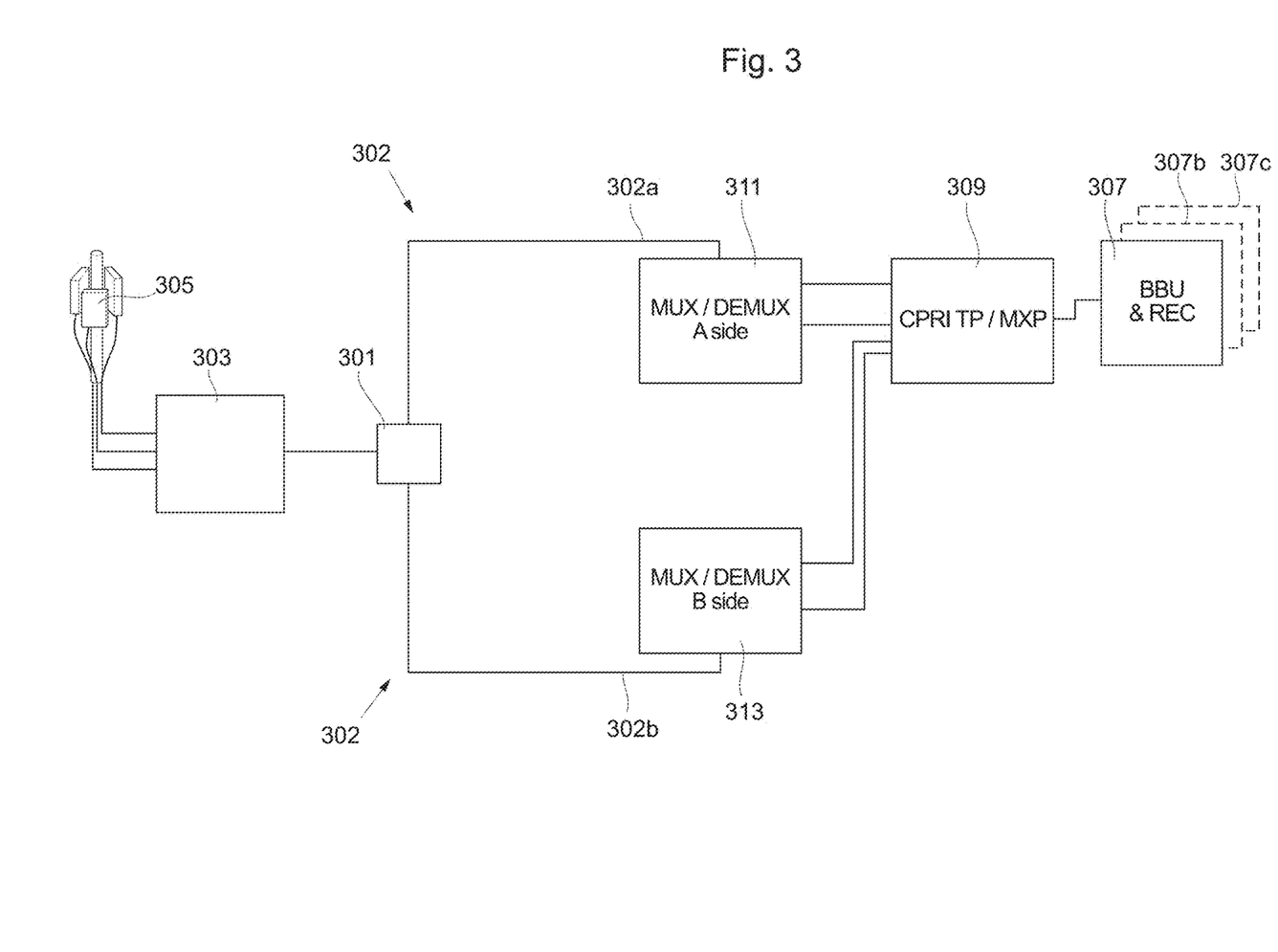
FIG. 3 illustrates the whole network including a protected ring.

FIG. 3 illustrates an exemplary complete network including the protected ring. This embodiment provides a protected interface/path at the CPRI interface. The right part of FIG. 3, i.e. boxes 311, 313, 309, 307, 307b, 307c is preferably located at a BBH (base band hotel). The CDAM (channel drop add multiplexer) 301 is typically placed in a manhole or in a small distribution site. The DU node 303 is typically placed at the roof, below the antenna 305 or at some location close to an antenna associated with the DU node 303 antenna 305. It is understood that any suitable number of CDAM 301 and corresponding DU nodes 303 can be provided in the ring, but only one is depicted here. Below some exemplary signaling steps are illustrated. The time delay difference of arrival at the second node between data sent in the working path and data sent in the protected path can be measured by calculating the time difference between, for example, the Start of Frame on the different paths. To know which path is shortest, a simple frame number mechanism can be used. But other methods are envisioned like using known bit-patterns such as start of packet, exemplified by Ethernet Start of Packet or time stamps, exemplified by Ethernet Time of Day. FIG. 3 further comprises multiplexer/demultiplexer, MUX/DEMUX A side 311, a MUX/DEMUX B side 313, a CPRI transponder/muxponder, TP/MXP 309, and a BBU/REC 307 connected to the CPRI TP/MXP 309. In the case the CPRI TP/MXP 309 is a muxponder, there may be more than one BBU/REC 307, 307b, 307c connected to the CPRI TP/MXP 309. In an embodiment, there may be more than one CPRI TP/MXP 309 connected to the MUX/DEMUX A side and B side 311, 313, and in that case, the more than one CPRI TP/MXP 309 may each be connected to one or more BBU/REC 307. The MUX/DEMUX A side 311 is connected to a first side 302a, also called first line direction, of the optical cable 302. The MUX/DEMUX B side 313 is connected to a second side 302b, or second line direction, of the optical cable 302. The CDAM 301 is arranged to add and drop optical signals to/from the optical fiber 302.

In the downstream traffic:
  The BBU/REC 307, 307b, 307c is connected to a CPRI TP/MXP 309. The CPRI TP/MXP 309 can be a transponder or a muxponder. If CPRI TP/MXP 309 is implemented as a muxponder, several CPRI channels nay be multiplexed by CPRI TP/MXP onto one channel. The former may be a proprietary format or the CPRI format itself. One or several CPRI channels may also be carried by Ethernet. In such a case it is Ethernet.
  The CPRI protocol stays untouched in the CPRI TP/MXP 309. The latency is also constant (apart from any buffer adjustments)

The CPRI TP/MXP is connected to the MUX/DEMUX A 311 and MUX/DEMUX B 313 but may only transmit on the active side, e.g. side A.

The CDAM (channel drop add multiplexer) 301 may drop and add the entire band from A and B side and combine/divide these with an optical coupler. Alternatively it may only drop a certain band or a certain selection of the available channels.

The DU node 303 contains a mux/demux (selecting the channels in use) and one or several CPRI TP/MXPes. The CPRI TP/MXP in DU node 303 receive the channel (only A or B transmitter side is active at the BBU).

The CPRI TP/MXP in DU node 303 receives the channel and demultiplex the channel (if MXP) and transmit the CPRI channel to the RRH. This is preferable done using a bidirectional small form-factor pluggable, SFP/SFP+, optical transceiver over single fiber or a normal SFP/SFP+ optical transceiver over a two fibers. No buffer adjustment is done. The SFP is a compact, hot-pluggable transceiver used for both telecommunication and data communications applications, for data rates below 10 Gbit/s. The enhanced SFP (SFP+) is an enhanced version that supports data rates up to 16 Gbit/s.

In the upstream traffic:

The CPRI TP/MXP in DU node 303 receives CPRI signal from RRH 305 (using normally a single or a dual SFP/SFP+)

If using a MXP several CPRI channels are multiplexed into a proprietary channel.

The CPRI TP/MXP in DU node 303 transmits the signal to the CDAM 301.

The CDAM 301 divides the signal and add this to A direction 302a and B direction 302b.

The MUX/DEMUX A 311 and MUX/DEMUX B 313 receive signal from A and B and feed this into the CPRI TP/MXP 309.

The CPRI TP/MXP 309 receives the signals and compare the delay between A and B path.

The time delay difference D is added to the signal seeing the shortest delay using a FIFO buffer, in the electrical domain.

In addition another delay T is added to signals. T is normally much shorter than D and is used to align the longer link with the shorter when this is the standby link. This to maintain a constant delay at the active link.

If the CPRI TP/MXP 409 is a muxponder, MXP; the format is demultiplexed into several CPRI channels.

The active signal path is fed to the output.

A delay will be added to the downstream traffic. At start up T and D+T will be added to the two different paths.

Once started, the buffer for the active path, e.g. 302a may not be adjusted. Instead, both upstream and downstream buffer adjustments shall be done at the standby path, e.g. 302b. This is done to ensure that the CPRI protocol will not require adjustment (beside what is done in the protocol itself).

The CPRI TP/MXP 309 at the BBH constantly monitor anomalies and defects, e.g. LOF (loss of frame), LOS (loss of signal), SD (signal degraded), etc. In case of e.g. a LOS, a transmitter of the CPRI TP/MXP 309 facing the faulty side, i.e. the active path, where the LOS was detected, shall be turned off and a transmitter facing the standby path shall be switched on. This can be done within a few ms.

The upstream CPRI signal will have a very short interruption caused by the detection and switch over time of the CPRI TP/MXP 309. The downstream signal will see a small additional delay caused by the transmission time through the fiber 302. The delay can typically be 75 µs assuming 15 km for the longest path.

It is assumed that the CPRI protocol won't need to reestablish the link having this short interrupt.

Notably, the MUX/DEMUX A side 311 and the MUX/DEMUX B side 313 and the CDAM 301 will preferably act on a single fiber (i.e. bidirectional communication) but may also be acting on two different fibers. The guaranteed latency accuracy is in this case much less. Several CDAM 301 may be sitting at a fiber ring. The CDAM could be implemented for example using an optical coupler 416 (see FIG. 4a) and alternatively using a band drop/add filter combined with a coupler 422 (see FIG. 4b). Several fiber rings may be used.

The proposed solution is most suitable using a DWDM but CDWM can also be used but then with much less capacity. The MUX/DEMUX 311, 313 could be implemented using single unit mux/demux with 100 GHz channel spacing, a mux with 100 GHz channel spacing and demux with 100 GHz channel spacing combined with an OIU (optical interleaver unit) or a mux and demux combined with an optical circulator. The mux and the demux at the latter two cases are shifted 50 GHz from each other creating a system with 50 GHz channel spacing where every second channel is going downstream and every second channel is going upstream.

Figure 4A:
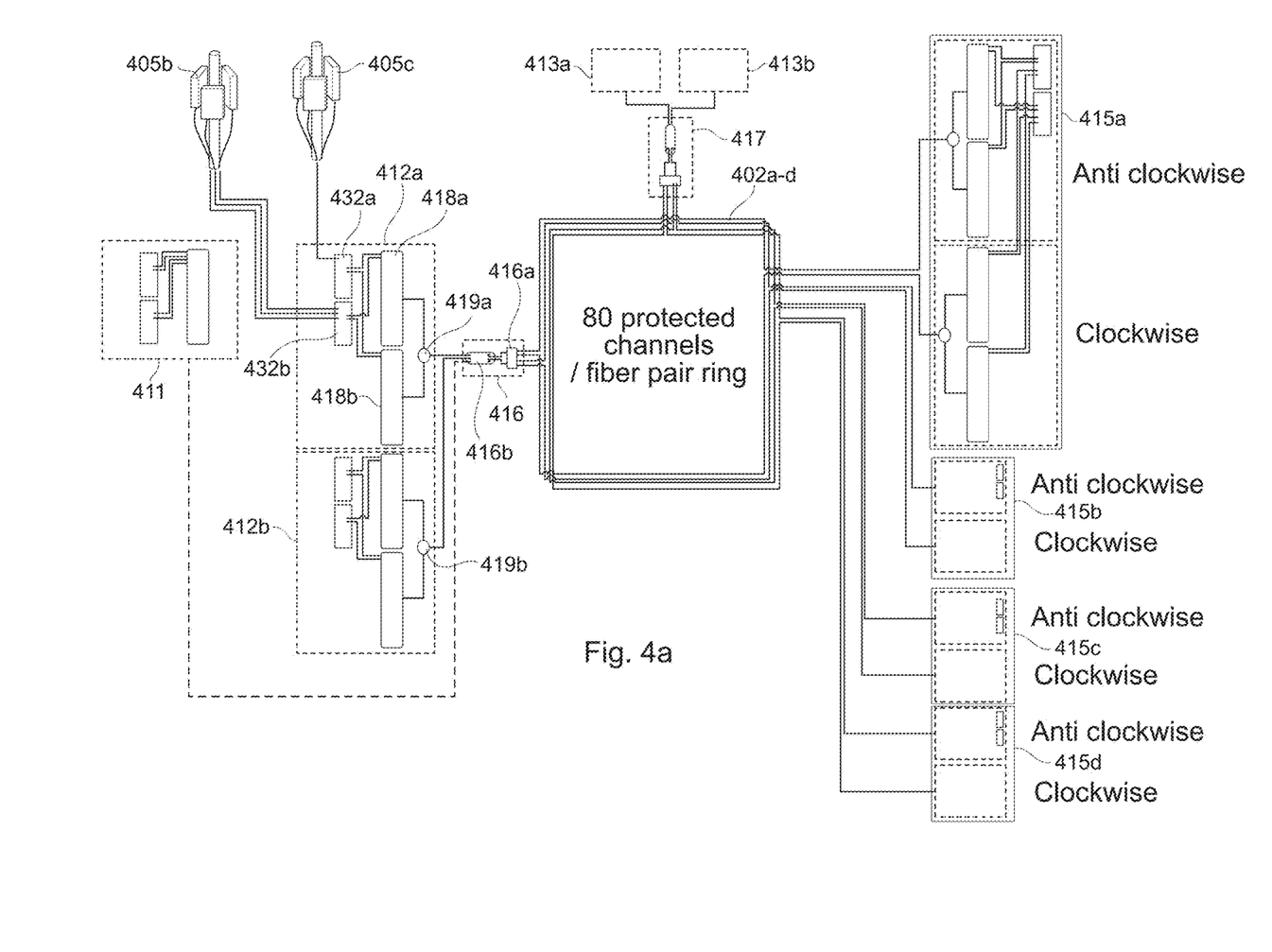
FIGS. 4a and 4b depict different implementations.

FIG. 4a depicts an 80 channel implementation using bi-directional communications. The CDAM includes in this case of two 3 dB couplers 416, 417 adding and combining signals to/from the A and B side of the fiber 402. The fiber 402 comprises in this alternative four fiber rings 402a-d. The DU node comprises two MUX/DEMUX units 412a, 412b, 413a, 413b. Each MUX/DEMUX is built up of an even and an odd channel WDM filter 418a, 418b e.g. an AWG filter. The MUX/DEMUX 412a, 412b, 413a, 413b each has two TP/MXP 432a, 432b connected to the WDM filters 418a, 418b. The MUX/DEMUX 412a, 412b, 413a, 413b are connected to antennas/RRH 405a, 405b, via the TP/MXPs 432a, 432b. The MUX/DEMUX 412a, 412b further connect to the 3 dB coupler 416 through optical circulators 419a, 419b allowing the even channels to be transported upstreams over the fiber rings 402a-d, i.e. towards the BBU, and the odd channels to be transported downstreams. The 3 dB coupler box 416 comprises the actual 3 dB coupler unit 416a and a fiber cable connection 416b connecting the 3 dB coupler unit to the fibers from the optical circulators 419a, 419b. There are two advantages using this scheme. Firstly, it reduced the loss and cost compared to using an OIU (optical interleaver unit) even if an OIU has some benefits and could be a possible realization of the optical circulator. Consequently, an alternative realization of the optical circulators 419a, 419b may be an OIU. Secondly, the DU node is likely to be placed in I-temped environment, i.e. placed in an environment fulfilling an industry temperature range such as −40 to 85 degrees Celsius.

Figure 4B:
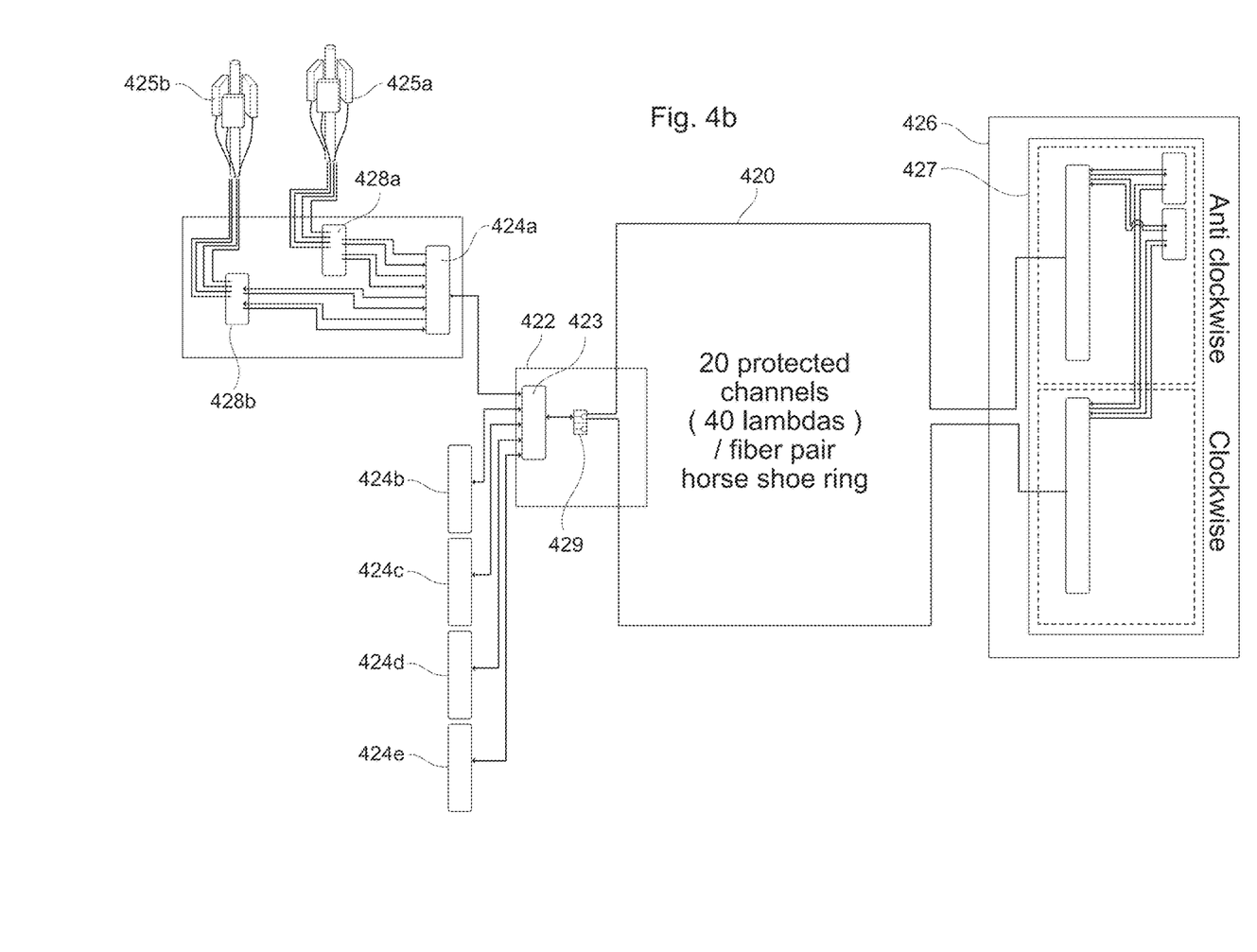

The leftmost box 411 of FIG. 4a depicts a 20 channel mux/demux solution without the use of a circulator, i.e. an alternative realization of the MUX/DEMUX 412a, 412b. All channels are even in this case. The system of FIG. 4a further comprises transceiving units 415a, 415b, 415c, 415d, one for each fiber 402a-d, the transceiving units including MUX/DEMUX and TP or MXP, the transceiving units being connected to the fiber at a different location of the fiber than the 3 dB couplers 416, 417. The transceiver units may be part of, or connected to, a baseband hotel comprising one or more BBUs. Other filter configurations are of course also possible. One such configuration is depicted in FIG. 4b. FIG. 4b shows a fiber ring 420 to which an CDAM 422 is connected. The CDAM has a 3 dB coupler 429 that receives signals from the fiber ring (downstream) and a band multiplexer 423 connected to the 3 dB coupler. The band multiplexer 423 is in its turn connected to a number of channel filters 424a, b, c, d, e, the filters being arranged to filter optical signals sent from/to RRHs/antennas 425a, 425b. The RRHs 425a, 425b are connected to the channel filters via TP/MXPs 428a, 428b. The system of FIG. 4b further comprises a BBU 426 that comprises a transceiving unit 427. The BBU may be a part of a baseband station hotel. The transceiving unit 427 may be similar to the transceiving units 415a-d of FIG. 4a.

Delay Compensation

Figure 5A:
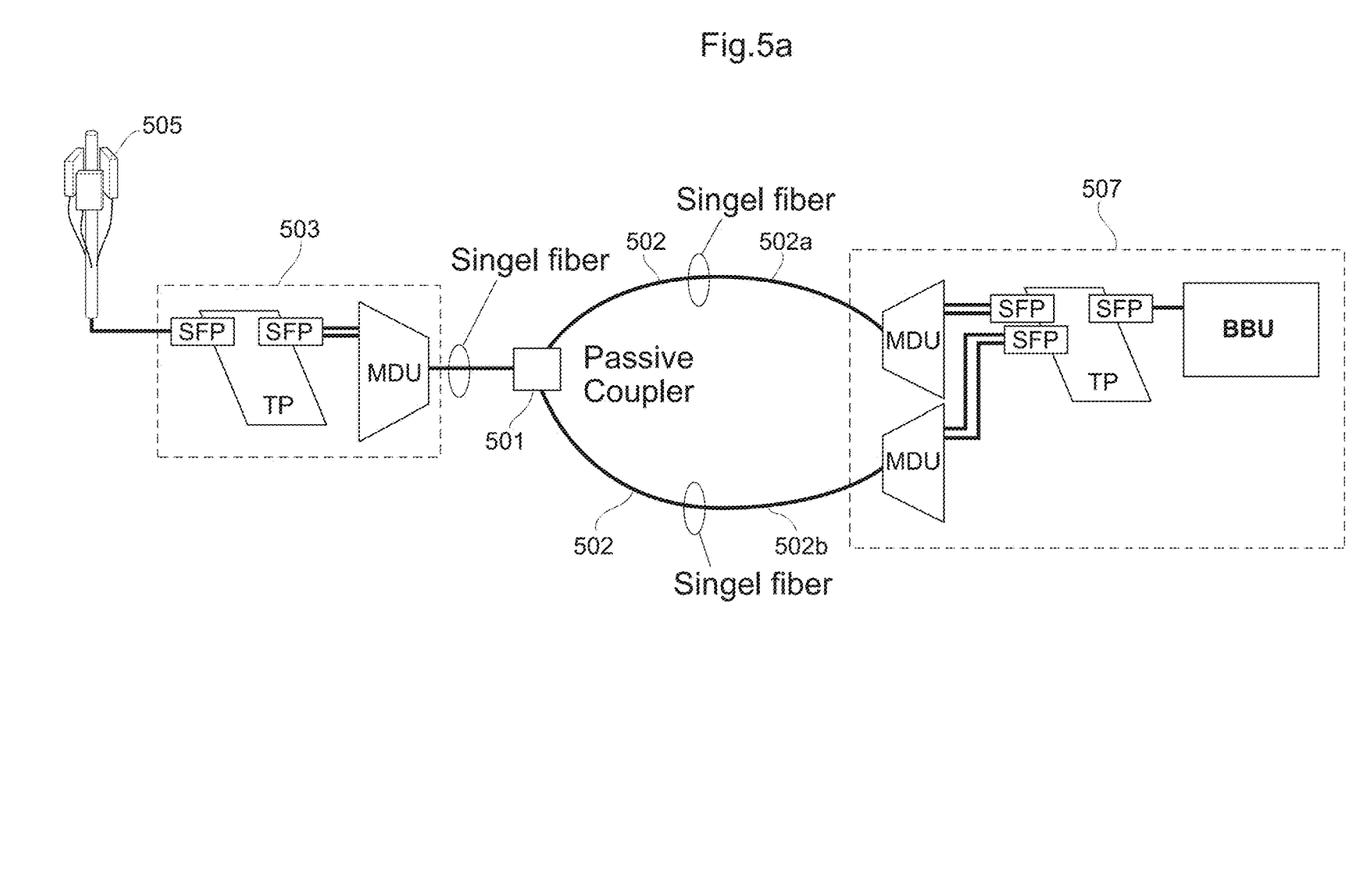
FIGS. 5a and 5b show embodiments of a protected link system with at least two active transmission paths for the CPRI link.

FIG. 5a shows one embodiment of the protected link system with at least two transmission paths, a first line direction and a second line direction, for the CPRI link. The embodiment comprises an RE 505 connected to a DU node 503 comprising a transponder or muxponder, TP, and an MDU. The DU node 503 is in its turn connected to a channel drop add device 501 that is connected to an optical fiber. The optical fiber has a first part 502a and a second part 502b that both extends from the channel add drop device 501 towards a BBU/REC 507. The first part 502a may be seen as a first line direction between the channel add drop device and the BBU/REC. The second part 502b may be seen as a second line direction between the channel add drop device and the BBU REC. As a further example, several DU nodes could also be used.

Figure 5B:
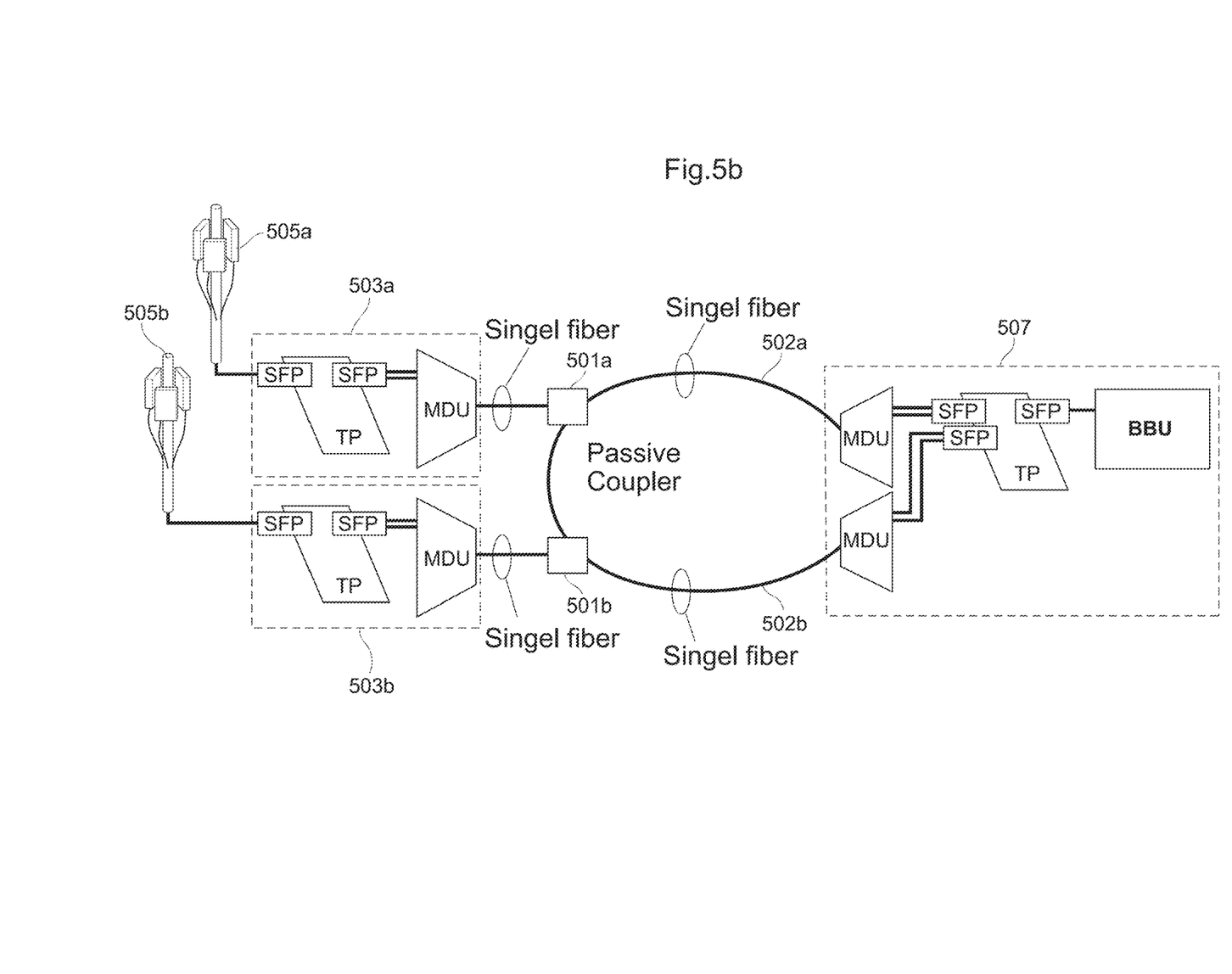

The signal from the RE (The antenna) 505 is coupled on two fiber parts 502a, 502b. In the BBU/REC node 507, the TP (Transponder or muxponder) will have two incoming signals, one from the first part 502a and one from the second part 502b, and is using one of them for communication. In case of a fiber break on the working fiber part it switches to the other fiber part. There can be many coupling devices 501 (such as the channel drop add multiplexer described above) provided in the same ring as depicted in FIG. 5b. I.e. FIG. 5b shows another example of a protected link system where there are two REs 505a, 505b, each connected via a DU 503a, 503b to a CDAM 501a, 501b coupled to the optical fiber. Further, there may be two TPs and two BBU-units in the BBU node 507, the TPs and BBU-units handling on RE 505a, 505b each. Also, as the REs (RRHs) 505a, 55b has three antennas each in the examples of FIGS. 5a and 5b, each DU 503/BBU 507 may have three TPs, one for each antenna.

In the opposite direction from the BBU 507 towards the antenna 505, the TP in the BBU unit is only transmitting on one of the fibers 502a, 502b. The active transmission fiber can be the same fiber as the TP is receiving on. In case of a fiber break on the active fiber TP starts to transmit on the other fiber. This scheme has a drawback and that is that the delay over the two fibers might be different, see FIG. 6 below. The improved scheme as described herein solves this problem.

Figure 6:
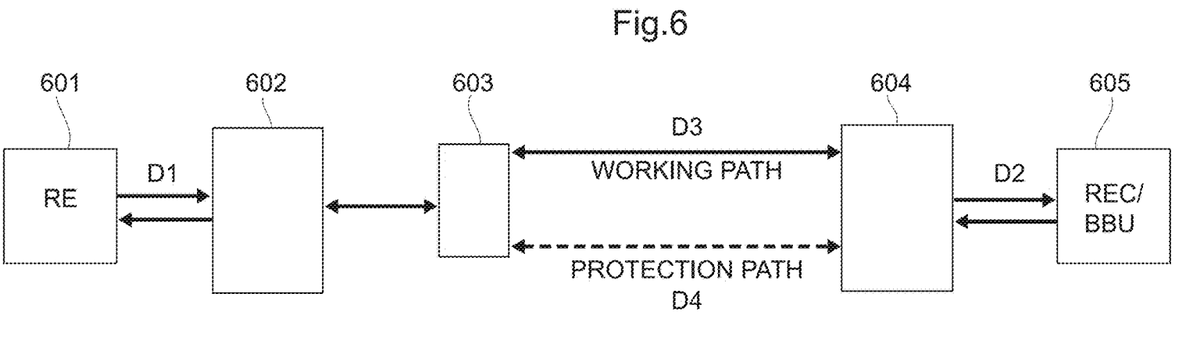
FIG. 6 shows a detailed data path.

FIG. 6 shows a detailed data path. The embodiment shows an RE 601 connected to a first TP/MXP 602. D1 symbolizes a delay of a signal between the RE 601 and the first TP/MXP 602. D3 symbolizes the delay of an optical signal transmitted in the first optical fiber path, a working path, from the first TP/MXP 602 towards a second TP/MXP 604 arranged at the optical fiber. D4 symbolizes the delay of an optical signal transmitted in the second optical fiber path, a protection path, from the first TP/MXP 602 towards the second TP/MXP 604. Further, the second TP/MXP 604 is connected to, or incorporated in, a REC 605. The first TP/MXP 602 is further connected to an optical splitter 603 arranged for sending an optical signal received from the first TP/MXP 602 into both the working path and the protection path. Further, the optical splitter can receive a signal both from the working path and the protection path but will normally only receive signals in either one of the working path and the protection path at the same time. The optical splitter 603 can be a part of the TP/MXP 602. The lower part of FIG. 6 shows the second TP/MUX 604 in a close-up view. A signal received from the REC 605 is received at a splitter 606 that copies the received signal and send it further to optical transceivers 608a, 608b. At any given moment only one of the transmitters in the optical transceivers 608a, 608b is active. If an error condition is detected in the receive path, e.g. in the working path, by the second TP/MXP 604, then a switch is made to the protection path and the transceiver 608a in the working path is turned off and the transceiver 608b in the protection path is turned on. 607 is a selector that selects to receive signals from the working path and the protection path. A WDM filter 614 is arranged as an interface of the TP/MUX 604 to the working path. The WDM filter 614 multiplexes respectively de-multiplexes data from/to the working path. In a similar way, a WDM filter 613 is arranged as an interface of the TP/MUX 604 to the protection path. D2 symbolizes a delay of a signal in and/or between the second TP/MXP 604 and the REC 605. A total delay from RE 601 to REC 605 would be over the working path D1+D2+D3, and over the protection path D1+D2+D4.

To compensate for the different fiber delays, D3 and D4, a delay compensation can be done in the TP 604. This can be performed by putting the Radio data (CPRI) in a TDM frame with a unique Start of Frame (SOF) delimiter. The TP 604 can compare the two incoming links and add a delay ($\Delta D=D4-D3$) via a FIFO (First in First out) buffer (or other delay elements) 609 on the shortest path in order to have the same latency regardless of which fiber is active. In this embodiment, the signals are in the electrical domain when they are delayed. In the transmit direction, towards the BBU/REC node, the same delay, $\Delta D$ also denoted D herein and in FIG. 6, is added on the shortest fiber and you will have a symmetrical system. The size of the delay element, for example the size of the FIFO buffer will set the limit on how long the difference between the active fiber path and the protection fiber path can be. An equal delay $\Delta D$ can be added in both the receiving direction and the transmitting direction on the shortest fiber to achieve a symmetrical system with equal delay on the (at least) two fibers where one is working and the other(s) serve as protection fibers.

The frames are numbered to be able to calculate which path that has the shortest delay. Since the same data goes out on both paths it is possible to find which one has the shortest delay.

In accordance with one embodiment an additional typically very small delay T, smaller than $\Delta D$, is added on both paths to enable small adjustments on the non-active path to compensate for latency differences that temperature differences cause. The delay T is preferably variable to allow for the system to compensate for the small differences that could result from e.g. temperature differences.

Figure 7:
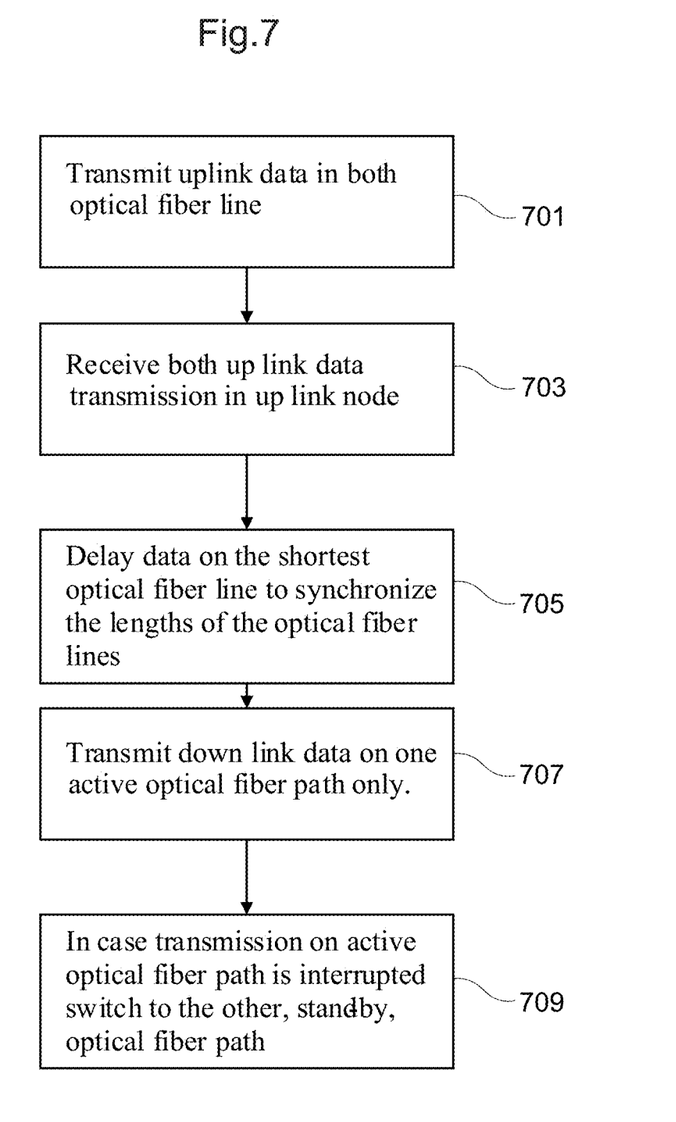
FIG. 7 is a flow chart illustrating some steps performed when transmitting data in a protected optical fiber system.

In FIG. 7 steps performed in an optical network comprising one or many remote nodes located in conjunction with a radio equipment are shown. The node(s) are in communication via an optical fiber with a base band node that is located in conjunction with a base band unit remote from the one or many nodes located in conjunction with the radio equipment. There are (at least) two optical transmission paths from the one or many remote nodes to the base band node. The remote nodes can be configured in a ring configuration. The remote nodes can be provided with a channel drop add device. In a first step 701 data from the remote nodes are transmitted in both of the two optical fibers to the base band node. The base band node can receive both data signals in a step 703. The data received over the shortest transmission line can be delayed in a step 705 with a delay D corresponding to the transmission path difference so that the two data signals are received in a synchronous manner. The base band node transmits data to the remote node(s) via one of the optical transmission paths, the active optical fiber path, in a step 707. The other optical fiber path serves as a protecting, stand-by, optical fiber path. In case the transmission on the active fiber path is interrupted, the base band node switches to transmit data on the stand-by optical fiber path in a step 709.

It will be clear to one skilled in the art that the above embodiments may be altered in many ways without departing from the scope of the invention. Accordingly, the scope of the invention should be determined by the following claims and their legal equivalents.

The invention claimed is:

1. A system, comprising:
 a channel drop add device arranged to receive a first signal and to divide the first signal into first and second signal portions, and to supply the first signal portion to a first optical fiber and the second signal portion to a second optical fiber; and
 a transceiver, including:
  a first receiver that is arranged to receive the first signal portion on the first optical fiber and to supply a first electrical signal based on the first signal portion,
  a second receiver that is arranged to receive the second signal portion on the second optical fiber and to supply a second electrical signal based on the second signal portion, wherein the transceiver is further arranged to process the first and second electrical signals and to output data carried by the first electrical signal, and
  a transmitter that is arranged to output a second optical signal on a channel of the first optical fiber towards the channel drop add device,
 wherein the channel drop add device is further arranged to receive the second optical signal, wherein the transceiver is arranged to synchronize the received first signal portion received on the first optical fiber with the received second signal portion received on the second optical fiber by delaying the one of the first signal portion and the second signal portion seeing the shortest delay.

2. A system in accordance with claim 1, wherein the transmitter is a first transmitter, the channel is a first channel, and the data is first data, the transceiver further includes:
 a second transmitter configured to output a third optical signal on a second channel, such that, in response to a fault in the first optical fiber, the third optical signal of the second channel is supplied to the second optical fiber and is received by the channel add drop device, and the transceiver is arranged to output second data carried by the second electrical signal.

3. A system in accordance with claim 1, further including a multiplexer/demultiplexer that is arranged to supply the signal to the channel add drop device and to receive one of the signals of the first and second channels from the first and second optical fibers, respectively.

4. A system in accordance with claim 1, wherein the transceiver is configured to delay the data carried by the first electrical signal or data carried by the second electrical signal.

5. A system in accordance with claim 1, wherein the channel drop add device is arranged to supply the first signal portion to the first optical fiber so that the first signal portion propagates over a first path including the first optical fiber, and to supply the second signal portion to the second optical fiber so that the second signal portion propagates over a second path including the second optical fiber, the first path being longer than the second path, wherein the transceiver is arranged to delay data carried by the second electrical signal relative to the data carried by the first electrical signal.

6. A system in accordance with claim 1, further including a first buffer and a second buffer, the first buffer being configured to delay the data carried by the first electrical signal and the second buffer being configured to delay data carried by the second electrical signal.

7. A system in accordance with claim 1, wherein the data conforms to a Common Public Radio Interface (CPRI) format.

8. A system in accordance with claim 1, wherein the data includes time division multiplexed (TDM) information.

9. A system in accordance with claim 1, wherein the first signal is a wavelength division multiplexed optical signal.

10. A system in accordance with claim 9, wherein the channel is a first channel and the wavelength division multiplexed optical signal includes a plurality of second channels, each of the plurality of second channels being separated from one another by 50 GHz, 100 GHz, or 200 GHz.

11. A method performed by an optical system, comprising:
 receiving a first optical signal;
 dividing the first optical signal into first and second signal portions;
 transmitting the first and second signal portions on first and second optical paths, respectively, the first and second paths including first and second optical fibers, respectively;
 detecting the first and second signal portions output on the first and the second optical paths, respectively;
 determining whether a fault is present in either the first or second optical paths based on the received first and second signal portions; and
 transmitting a second optical signal on a channel only on the first optical fiber when the fault is present in the second optical path, such that the second optical signal is transmitted in the optical fiber in a direction opposite that of the first signal portion, wherein a length of the first optical path is longer than a length of the second optical path, the first optical signal portion carries first data, and the second optical signal portion carries second data, the first data being the same as the second data, the method further including:
 delaying the second data relative to the first data.

12. A method in accordance with claim 11, further comprising:
 synchronizing the first data with the second data after the first and second signal portions have been output from the first and second optical fibers, respectively.

13. A method in accordance with claim 12, wherein the first and second data include a plurality of frames, the method further including:
 adding each of a plurality of frame counters to a corresponding one of the plurality of frames, the synchronizing step including comparing the plurality of frame counters associated with the first data with the plurality of frame counters associated with the second data.

14. A method in accordance with claim 11, wherein the step of determining whether a fault is present includes determining at least one of: a loss of the second signal portion, a loss of a frame carried by the second signal portion, and degradation of the second signal portion.

15. A method in accordance with claim 11, wherein the first and second data conform to a Common Public Radio Interface (CPRI) format.

16. A method in accordance with claim 11, wherein the delaying step includes delaying both the first and second data by a first delay and further delaying the second data by a second delay.

17. A method in accordance with claim 11, wherein the data includes time division multiplexed information.

18. A system, comprising:
a remote radio head;
a multiplexer/demultiplexer that is arranged to receive first signals from the remote radio head;
a channel drop add multiplexer that is arranged to receive second signals based on the first signals from the multiplexer/demultiplexer and to divide the second signals into first and second signal portions, the first portion being supplied to a first optical fiber and the second portion being supplied to a second optical fiber;
a transceiver, including:
a first receiver that is arranged to receive the first signal portion and to supply a first electrical signal based on the first signal portion,
a second receiver that is arranged to receive the second signal portion and to supply a second electrical signal based on the first signal portion, wherein the transceiver is arranged to process the first and second electrical signals and to output data carried by the first electrical signal, the transceiver outputting the data, and
a transmitter that is arranged to output a channel to the first optical fiber, such that the channel is received by the channel drop add multiplexer, wherein the channel is transmitted in the first optical fiber in a direction opposite the first signal portion; and
a baseband unit that is arranged to receive the data from the transceiver.

19. A system in accordance with claim 18, wherein the transmitter is a first transmitter, the channel is a first channel, and the data is first data, the transceiver further includes:
a second transmitter configured to output a third optical signal on a second channel, such that, in response to a fault in the first optical fiber, the third optical signal of the second channel is supplied to the second optical fiber and is received by the channel drop add multiplexer, and the transceiver is arranged to output second data carried by the second electrical signal.

20. A system in accordance with claim 18, wherein the channel drop add multiplexer is arranged to supply the first signal portion to the first optical fiber so that the first signal portion propagates over a first path including the first optical fiber, and to supply the second signal portion to the second optical fiber so that the second signal portion propagates over a second path including the second optical fiber, the first path being longer than the second path, wherein the transceiver is arranged to delay data carried by the second electrical signal relative to the data carried by the first electrical signal.

* * * * *